Nov. 26, 1929.   R. H. SIMONDS   1,736,956
MACHINE FOR MAKING SPECTACLE TEMPLES
Filed Dec. 3, 1924   2 Sheets-Sheet 1
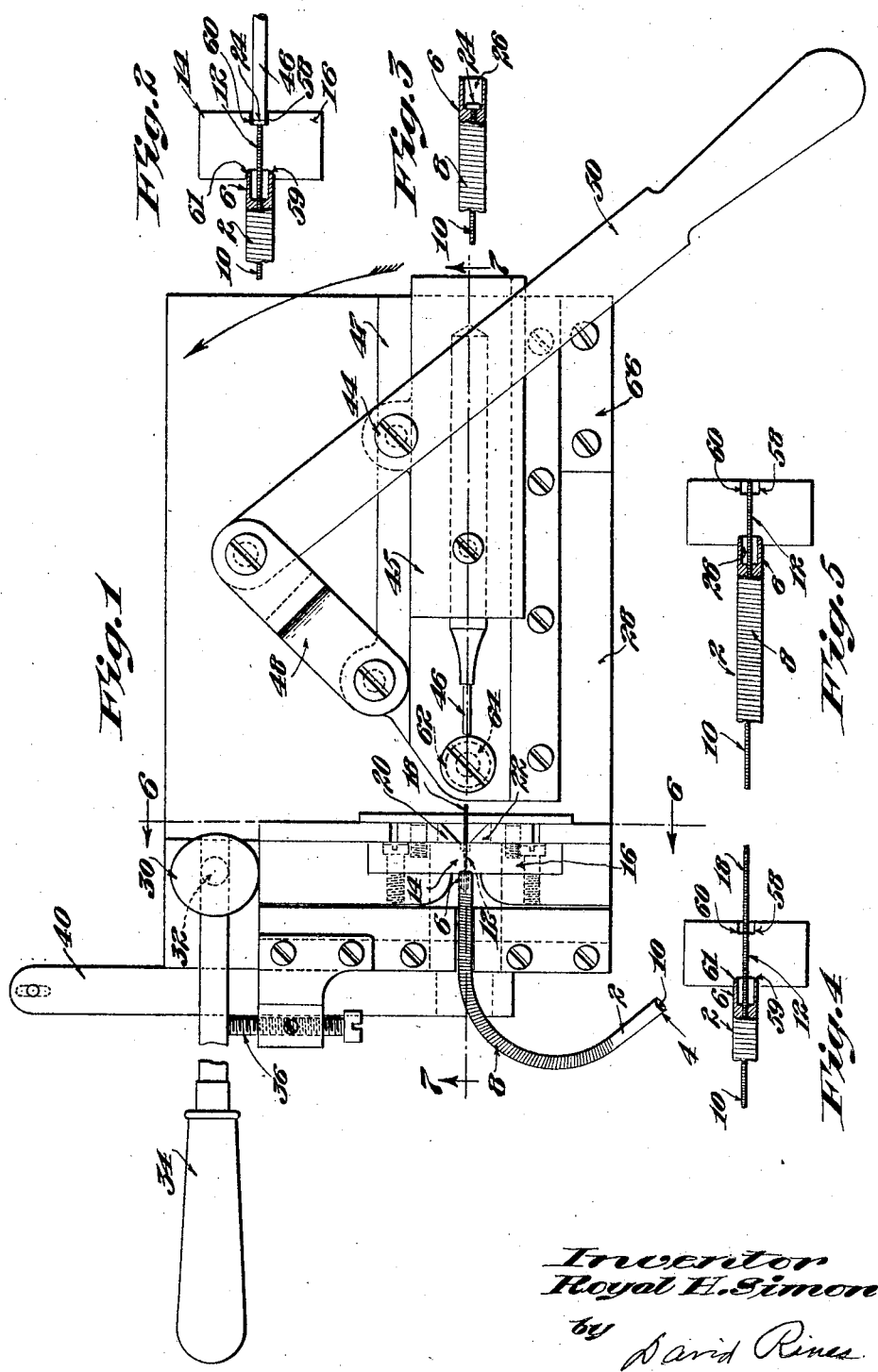

Nov. 26, 1929.　　　R. H. SIMONDS　　　1,736,956
MACHINE FOR MAKING SPECTACLE TEMPLES
Filed Dec. 3, 1924　　2 Sheets-Sheet 2
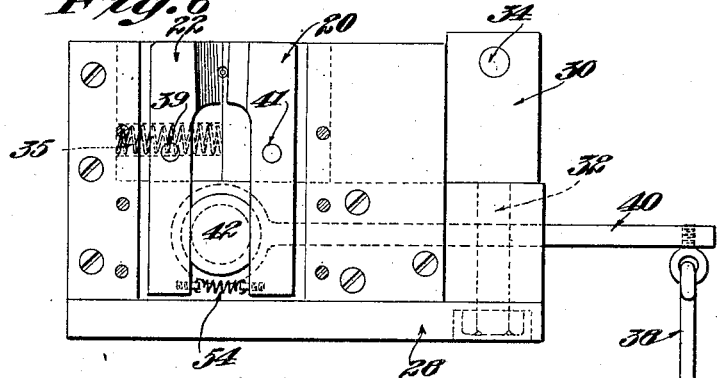
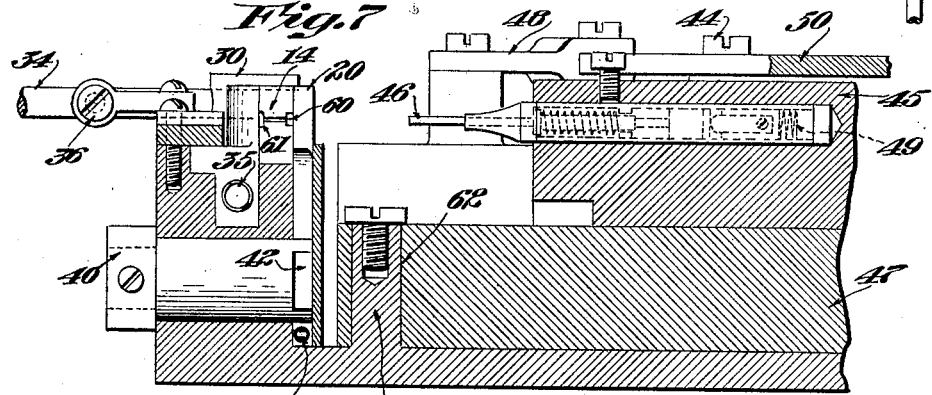
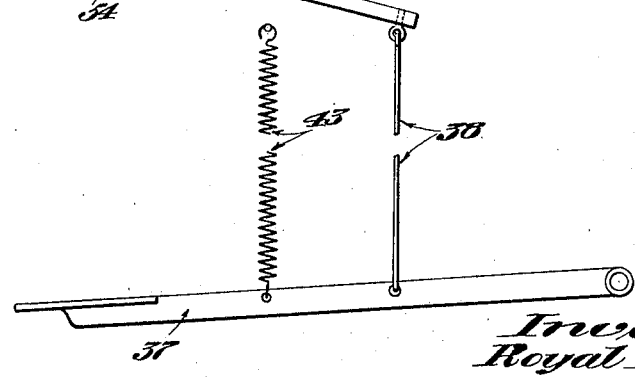
Inventor
Royal H. Simonds
by David Rines
his Atty.

Patented Nov. 26, 1929

1,736,956

UNITED STATES PATENT OFFICE

ROYAL H. SIMONDS, OF SOUTHBRIDGE, MASSACHUSETTS, ASSIGNOR TO BAUSCH & LOMB OPTICAL COMPANY, OF ROCHESTER, NEW YORK, A CORPORATION OF NEW YORK

MACHINE FOR MAKING SPECTACLE TEMPLES

Application filed December 3, 1924. Serial No. 753,755.

The present invention, while having other fields of application, is more particularly related to machines for making spectacle temples, and more especially cable temples of the non-metal type.

Some temples of the above-described character comprise a non-metal tube a portion of which is cut into the form of a spiral and a reinforcing core in the tube. It is desirable to compress the spiral portion of the tube longitudinally of the core, and then to secure the tube and the core in such assembled relation.

An object of the invention is to provide an improved machine for manufacturing temples of the above-named type.

Other and further objects will be hereinafter explained, illustrated in the accompanying drawings and defined in the appended claims. It is intended, by suitable expression in the claims, to cover all the novelty that the invention may possess.

With the above objects in view, the invention consists of the improved machine a preferred embodiment of which is hereinafter described, illustrated in the accompanying drawings, and defined in the claims.

In the drawings, Fig. 1 is a plan of a machine constructed according to a preferred embodiment of the present invention; Figs. 2, 3, 4 and 5 are fragmentary views illustrating the operation of the machine shown in Fig. 1; Figs. 6 and 7 are sections taken upon the lines 6—6 and 7—7, respectively, of Fig. 1, looking in the direction of the arrows; and Fig. 8 is a detail view of the preferred mechanism for actuating the cutters shown in Fig. 1, looking in the direction of the arrows; and upon a smaller scale.

Cable temples of a well-known type comprise a tube 2 of some non-metal material, like zylonite, celluloid, and the like. An intermediate portion of the tube 2, between the shank portion 4 and the end 6, is cut in the form of a spiral or helix, as shown at 8, which renders it very yielding. By comparison, the uncut portions 4 and 6 of the tube are rigid. A metal reinforcing rod or core 10 is then inserted in the bore of the tube 2 and is fixed in the shank portion 4 of the tube in any well-known manner. The spirally cut portion 8 of the tube, with the metal core 10 therein, is then bent into a loop or temple shape. The spiral portion 8 of the tube is next compressed along the core 10, and the core and the compressed portion 8 are assembled together securely, completing the temple.

A chief object of the present invention is to provide an improved machine for performing the final operations above described. To this end, a portion 12 of the core 10, near the free terminal 18 thereof, is first introduced between jaws 14 and 16. The jaws are then clamped very tightly against the portion 12. The terminal portion 18 is now seized by hand, and pulled toward the right, as viewed in Fig. 1. During its movement toward the right, it is guided in a horizontally disposed guide formed between the jaws. This guide terminates in a cylindrical recess 59, 61 of the jaws, into which the end 6 of the tube 2 is dragged and is there loosely held, while the operator continues to pull the core 10 towards the right. The spiral portion 8 of the tube 2 thus becomes compressed along the core 10. After the required degree of compression has been attained, the portion 12 of the core 10 is tightly clamped by the jaws, in a manner hereinafter described. The terminal portion 18 of the core 10 is then cut from the core by cutters 20 and 22. The portion of the core 10 near the severed portion is then upset, as indicated at 24. The compressed portion of the tube 8 is finally permitted to spring back, by its own resiliency, into contact with the upset portion 24 of the core 10. Preferably, the end portion 6 of the tube 2 is provided with a terminal recess 26 into which the upset portion 24 becomes seated when the compressed portion 8 of the tube is released, as before described. The recess 26 may be plugged, thereby effectually concealing the upset portion 24 of the rod 10.

The jaw 16 is shown stationary, and the jaw 14 as slidable toward the jaw 16 along a bed portion 28 of the frame of the machine. Sliding actuation of the jaw 14 toward the jaw 16 may be effected by an eccentric cam 30 that is pivoted to the bed 28 of the machine at 32 and that may be actuated about its pivot 32 by a handle 34. An adjustable stop 36 determines the degree of clamping pressure that the jaws 14 and 16 shall exert upon the portion 12 of the core 10 by determining the maximum space that may separate the jaws 14 and 16 in the limiting position of movement of the jaw 14. The jaw 14 is adapted to be returned to its non-clamping position by a coiled spring 35.

After the portion 12 of the core 10 has been clamped between the jaws 14 and 16, the operator actuates the knives 20 and 22 to sever the terminal portion 18 of the core. This is effected by means of a treadle rod 37, acting through a treadle rod 38 upon a lever 40. The lever 40 is fixed to a rocking cam 42 that is adapted to actuate the knives towards each other about pivotal points 39 and 41. A spring 54 is adapted to return the knives to their ineffective or non-cutting positions. This action is aided by a spring 43 that acts upon the lever 40 through the treadle rod 38.

A lever 50 is now actuated to cause the reciprocating movement of an upsetting die 46 toward the freshly severed portion of the core 10. The die is mounted upon a carriage 45 to which the lever 50 is intermediately pivoted at 44. The carriage 45 is slidably mounted upon a support 47 to which the lever 50 is linked at 48. A very effective leverage is thereby provided for actuating the carriage 45. A reciprocating movement of the carriage 45 will bring the die 46 against the freshly severed end of the core 10, and further movement will cause the die 46 to be spring-pressed backward, toward the right, as viewed in Figs. 1 and 7. When the die has been pressed back sufficiently far, it will cause a spring 49, Fig. 7, to come into action to force the die 46 forward, toward the left, with considerable force, causing the end of the core to become upset, as shown at 24. Devices of this character are old and well known and are somewhat similar to the device illustrated in the patent to Dedrick No. 1,149,737 of August 10, 1915. The mechanism of the upsetting die 46 is not further described herein because other mechanisms may be employed equally well without departing from the invention.

In order to make uniform the size and shape of the upset end 24, the jaws 14 and 16 are provided with complementary, oppositely disposed recesses 58 and 60, respectively, that together form a single cylindrical recess of about the diameter of the recess 26 of the terminal portion 6 of the tube 2. The die 46 is shown in Fig. 2 as entering the cylindrical recess 58, 60 to produce the upset terminal portion 24. In Fig. 3, the upset portion 24 is seated in its recess 26.

The carriage 45, the die 46 carried thereby, the lever 50 and their associated parts, are all mounted upon the support 47, as before described. The support 47 is provided with an opening 62 within which is received a bearing stud 64 of the bed 28, so as to permit pivoting the support 47 and the parts carried thereby in the direction of the curved arrow, Fig. 1. This permits the support to be moved out of the way of the terminal portion 18 of the core 10, when the core 10 is initially placed between the jaws 14 and 16, as before described. After the jaws 14 and 16 have clamped the portion 12 of the core 10, and the knives have been actuated to sever the portion 18 of the rod 10, the support 47 is pivotally actuated back to the position illustrated in Fig. 1, in contact with a stop 66. The machine is now ready for another upsetting operation.

It will be understood that the invention is not restricted to the exact embodiment thereof that is illustrated and described herein, but is subject to modification by persons skilled in the art, and all such modifications are considered to fall within the spirit of the present invention, the scope of which is defined in the appended claims.

What is claimed is:

1. A machine of the class described having, in combination, means for holding a tube so that it may be compressed along a supporting core extending within the tube, means for severing the core while the tube is compressed and means for enlarging the severed end of the core so that when the tube is allowed to expand the enlarged end will seat against the end of the tube.

2. A machine of the class described having, in combination, means for holding a tube so that it may be compressed along a supporting core extending within the tube, and means for enlarging the core at a point adjacent to the end of the tube so that when the tube is allowed to expand the enlarged portion of the core will seat against the said end.

3. A machine of the class described having, in combination, means for holding a spiral tube so that it may be compressed along a supporting core extending within the tube, and means for enlarging the core at a point adjacent to the end of the tube so that when the tube is allowed to expand the enlarged portion of the core will seat against the said end.

4. A machine of the class described having, in combination, means for holding a spiral tube so that it may be compressed along a supporting core, the tube being provided with an enlarged recess at one end, and means for enlarging the core at a point adjacent to the recess so that when the tube is allowed to expand the enlarged portion of the core will enter the recess.

5. A machine for making a spectacle temple comprising a spirally cut tube having a core therein, the said machine having, in combination, means for holding the tube so that it may be compressed along the core, and means for enlarging the core at a point adjacent to the end of the tube so that when the tube is allowed to expand the enlarged portion of the core will seat against the said end.

In testimony whereof, I have hereunto subscribed my name this 18th day of November, 1924.

ROYAL H. SIMONDS.